US012768481B2

(12) United States Patent
Ronnheim et al.

(10) Patent No.: US 12,768,481 B2
(45) Date of Patent: Oct. 20, 2026

(54) COUPLING AND METHOD FOR ASSEMBLING THE SAME

(71) Applicant: CEJN AB, Skovde (SE)

(72) Inventors: Marcus Ronnheim, Skovde (SE); Par-Magnus Bjurek, Skovde (SE)

(73) Assignee: CEJN AB, Skovde (SE)

( * ) Notice: Subject to any disclaimer, the term of this patent is extended or adjusted under 35 U.S.C. 154(b) by 293 days.

(21) Appl. No.: 17/641,690

(22) PCT Filed: Oct. 2, 2019

(86) PCT No.: PCT/EP2019/076742
§ 371 (c)(1),
(2) Date: Mar. 9, 2022

(87) PCT Pub. No.: WO2021/063499
PCT Pub. Date: Apr. 8, 2021

(65) Prior Publication Data

US 2022/0299142 A1 Sep. 22, 2022

(51) Int. Cl.
*F16L 37/098* (2006.01)
*F16L 37/084* (2006.01)

(52) U.S. Cl.
CPC ....... *F16L 37/0985* (2013.01); *F16L 37/0842* (2013.01)

(58) Field of Classification Search
CPC ............... F16L 37/0842; F16L 37/0845; F16L 37/0847; F16L 37/096; F16L 37/098;
(Continued)

(56) References Cited

U.S. PATENT DOCUMENTS 1,383,209 A * 6/1921 Iftiger ................. F16L 37/0842 184/105.3
3,510,153 A * 5/1970 Newton ................ E21B 33/038 285/320
(Continued)

FOREIGN PATENT DOCUMENTS

EP 1095225 B1 * 5/2002 .......... F16L 37/0842
FR 1410901 A * 9/1965 .......... F16L 37/0845
(Continued)

OTHER PUBLICATIONS

Omnexus, "Comprehensive List of Transparent Polymers", Oct. 2017 (Year: 2017).*
(Continued)

*Primary Examiner* — Matthew Troutman
*Assistant Examiner* — Alexander T Rufrano
(74) *Attorney, Agent, or Firm* — Smith, Gambrell & Russell LLP

(57) ABSTRACT

A coupling for a nipple is disclosed. The coupling comprises a main body (100); and an opening (110), for a fluid, in the main body (100), the opening (110) being cylindrical. The coupling comprises further a holder (130) arranged in the opening (110) holding a plurality of locking elements (140) for locking the nipple to the coupling, the holder (130) and the plurality of locking elements (140) being separate; and a retaining element (150) retaining the holder (130) in the opening (110), the retaining element (150) engaging the plurality of locking elements (140). A method for assembling such a coupling is disclosed. The method comprises inserting the holder (130) with the locking means (140) into the main body (100); and retaining the holder (130) in the main body (100) with the retaining means (150).

14 Claims, 4 Drawing Sheets

(58) Field of Classification Search
CPC . F16L 37/0985; F16L 37/0925; F16L 37/133; F16L 37/12; F16L 37/127
See application file for complete search history.

(56) References Cited

U.S. PATENT DOCUMENTS

| | | | | | |
|---|---|---|---|---|---|
| 3,744,824 | A * | 7/1973 | Roos | F16L 37/0842 285/317 |
| 4,613,172 | A * | 9/1986 | Schattmaier | F16L 37/0842 285/902 |
| 4,645,245 | A * | 2/1987 | Cunningham | F16L 37/088 285/353 |
| 4,842,309 | A * | 6/1989 | LaVene | F16L 37/0842 285/353 |
| 5,681,062 | A | 10/1997 | Fukao et al. | |
| 5,752,726 | A | 5/1998 | Fixemer | |
| 6,129,390 | A * | 10/2000 | Ohlsson | F16L 37/0842 285/317 |
| 7,735,880 | B2 * | 6/2010 | Ohlsson | F16L 37/12 285/272 |
| 11,060,648 | B2 * | 7/2021 | Kwak | F16L 15/007 |
| 11,746,941 | B2 * | 9/2023 | Search | F16L 37/096 285/305 |
| 2017/0343142 | A1 | 11/2017 | Kim | |

FOREIGN PATENT DOCUMENTS

| | | | |
|---|---|---|---|
| GB | 2457149 | A | 8/2009 |
| JP | 09-049594 | A | 2/1997 |
| JP | 09-089178 | A | 3/1997 |
| JP | 2018-501449 | A | 1/2018 |
| WO | 2004085903 | A1 | 10/2004 |
| WO | 2013012154 | A1 | 1/2013 |

OTHER PUBLICATIONS

FR-1410901 Translation (Year: 1965).*
International Search Report and Written Opinion for Application No. PCT/EP2019/076742, dated Jun. 30, 2020; 11 pages.
Decision to Grant received for Japanese Patent Application No. 2022-513383, mailed on Aug. 1, 2023, 5 pages (2 pages of English Translation and 3 pages of Original Document).

* cited by examiner

COUPLING AND METHOD FOR ASSEMBLING THE SAME

CROSS-REFERENCE TO RELATED APPLICATIONS

This application is a U.S. National Stage Application filed under 35 U.S.C. § 371(a) of International Patent Application Serial No. PCT/EP2019/076742, filed Oct. 2, 2019, which is hereby incorporated by reference in its entirety.

TECHNICAL FIELD

The present disclosure relates to a coupling. More particularly, the present disclosure relates to a coupling for a nipple, and a method for assembling such a coupling, preferably a quick connect coupling, such as a push to connect and push-pull to disconnect coupling.

BACKGROUND

Couplings, for example quick connect couplings for fluid, often have a coupling and a nipple. The nipple may be referred to as the male part and the coupling may be referred to as the female part. Such couplings are used for connecting fluids.

Couplings are know from EP0870148 and WO88/09459. These are quick connect couplings, push to connect and push-pull to disconnect coupling. To connect the nipple to the coupling, the nipple is pushed into the coupling. To disconnect, the nipple is pushed first into the coupling, and then pulled out. To prevent an unwanted disconnection, a mounting latch prevents that the nipple can be pushed into the coupling. The mounting latch must thus be removed before a disconnection can be done. These couplings are very secure because once connected, it is basically impossible to remove the nipple from the coupling by force or accident. However, the constructions of these couplings causes several problems. They are very complicated to assemble. They require many small parts that have to be assembled inside the coupling. It is therefore desirable to overcome these problems and improve the coupling.

It is also desirable to provide a coupling that is inexpensive to manufacture, is easy to manufacture, is easy to assemble, and is robust. The coupling must also be able to be manufactured in different sizes. A further important consideration is that an improved coupling must still be able to connect with existing nipples. The present disclosure is directed to overcoming one or more of the problems as set forth above.

SUMMARY OF THE INVENTION

It is an object of the present invention to provide a coupling for a nipple, and a method for assembling such a coupling. This object can be achieved by the features as defined by the independent claims. Further enhancements are characterised by the dependent claims.

According to one embodiment, a coupling for a nipple is provided. The coupling comprises a main body 100; and an opening 110, for a fluid, in the main body 100, the opening 110 being cylindrical. The coupling further comprises a holder 130 arranged in the opening 110, the holder 130 holding a plurality of locking elements 140 for locking the nipple to the coupling, the holder 130 and the plurality of locking elements 140 being separate; and a retaining element 150 retaining the holder 130 in the opening 110, the retaining element 150 engaging the plurality of locking elements 140. The holder 130, the plurality of locking elements 140, and the retaining element 150 may be separate, independent, parts from each other, i.e. not being integral.

According to one embodiment, the holder 130 may comprise a plurality of extensions 134 extending in the axial direction of the coupling. Each extension 134 may have two sides parallel to the axial direction of the coupling, when the holder is in the coupling. Each side of the extensions 134 being in contact with a side of a locking element 140, respectively. The number of extensions 134 may be the same as the number of locking elements 140.

According to one embodiment, the retaining element 150 may comprise a locking element groove 152 for engaging, supporting, the plurality of locking elements 140.

According to one embodiment, the holder 130 may comprise a separate elastic element 132 urging each locking element 140 inwardly. The holder 130, the elastic element 132, the plurality of locking elements 140, and the retaining element 150 may be separate, independent, parts from each other, i.e. not being integral with each other.

According to one embodiment, each locking element 140 is a separate element and is substantially rectangular with one rounded end 142 and an opposite end 144 having a groove 146. According to one embodiment, each locking element 140 may be substantially rectangular and may be curved. According to one embodiment, each locking element 140 may have two sides 148 parallel to the axial direction of the coupling, each side being supported by, in contact with, the holder 130.

According to one embodiment, the holder 130 may be arranged between a shoulder 126 and the retaining element 150, the shoulder 126 may be formed by the opening 110 and a second opening 120. The opening 110 may have a first diameter 112, and the further, second, opening 120 may be in the main body 100, the second opening 120 may be cylindrical, may have a second diameter 122, co-axial with the first opening 110, and the second diameter 122 may be larger than the first diameter 112. The holder 130 may be arranged in the second opening 120.

According to one embodiment, a sealing element 160 may be arranged on the main body 100, and/or on the holder 130, for sealing against the nipple.

According to one embodiment, the holder 130 may be arranged between a stop 128 and the retaining element 150, the stop 128 may be arranged in the opening 110. The stop 128 may be a separate element, holding, catching the holder 130, and preventing axial movement of the holder 130 relative to the opening 110.

According to one embodiment, the holder 130 may be made out of plastic. The locking elements 140 may be made out of metal, for example steel, and retaining element 150 may be made of metal, for example steel.

According to one embodiment, the holder 130 may hold 2, 3, 4, 5, 6, 7, 8, or 9 locking elements 140. Preferably the holder 130 holds three or four locking elements 140.

According to one embodiment, the coupling is a push-pull coupling, or a click-to-connect coupling. The coupling may be a quick connect coupling, such as for example a push to connect and push-pull to disconnect coupling. The coupling may be a WEO coupling.

According to one embodiment, the retaining element 150 engages the main body 100 by threads 114.

According to one embodiment, the holder 130, the plurality of locking elements 140, and the retaining element 150 may be integrally formed as one cylindrical cage 300, the cage 300 may have a plurality of outwardly projecting protrusions as the retaining element 150. According to one embodiment, the elastic element 132 may also be integrally part of the cylindrical cage 300.

According to one embodiment, a method assembling a coupling according to any one of the preceding embodiment is disclosed. The method comprises the following steps: inserting the holder 130 with the locking means 140 into the main body 100; and retaining the holder 130 in the main body 100 with the retaining means 150. Preferably the steps are made in order. An additional step may be to insert the sealing means 160 into the main body 100 or into the holder 130 as the first or second step.

One or more embodiments disclosed herein provide a coupling for a nipple, and a method of assembling the same. At least one embodiment provides a coupling that connects with existing nipples. At least one embodiment provides a coupling that is inexpensive to manufacture, is easy to manufacture, is easy to assemble, and is robust. At least one embodiment provides a coupling that is safe, and that can be scaled and easily adapted to different uses and embodiments.

At least one of the above embodiments provides one or more solutions to the problems and disadvantages with the background art. Other technical advantages of the present disclosure will be readily apparent to one skilled in the art from the following description and claims. Various embodiments of the present application obtain only a subset of the advantages set forth. No one advantage is critical to the embodiments. Any claimed embodiment disclosed herein may be technically combined with any other claimed embodiment(s) disclosed herein.

BRIEF DESCRIPTION OF THE DRAWINGS

The accompanying drawings illustrate presently exemplary embodiments of the disclosure, and together with the general description given above and the detailed description of the embodiments given below, serve to explain, by way of example, the principles of the disclosure.

DETAILED DESCRIPTION

Figure 1:
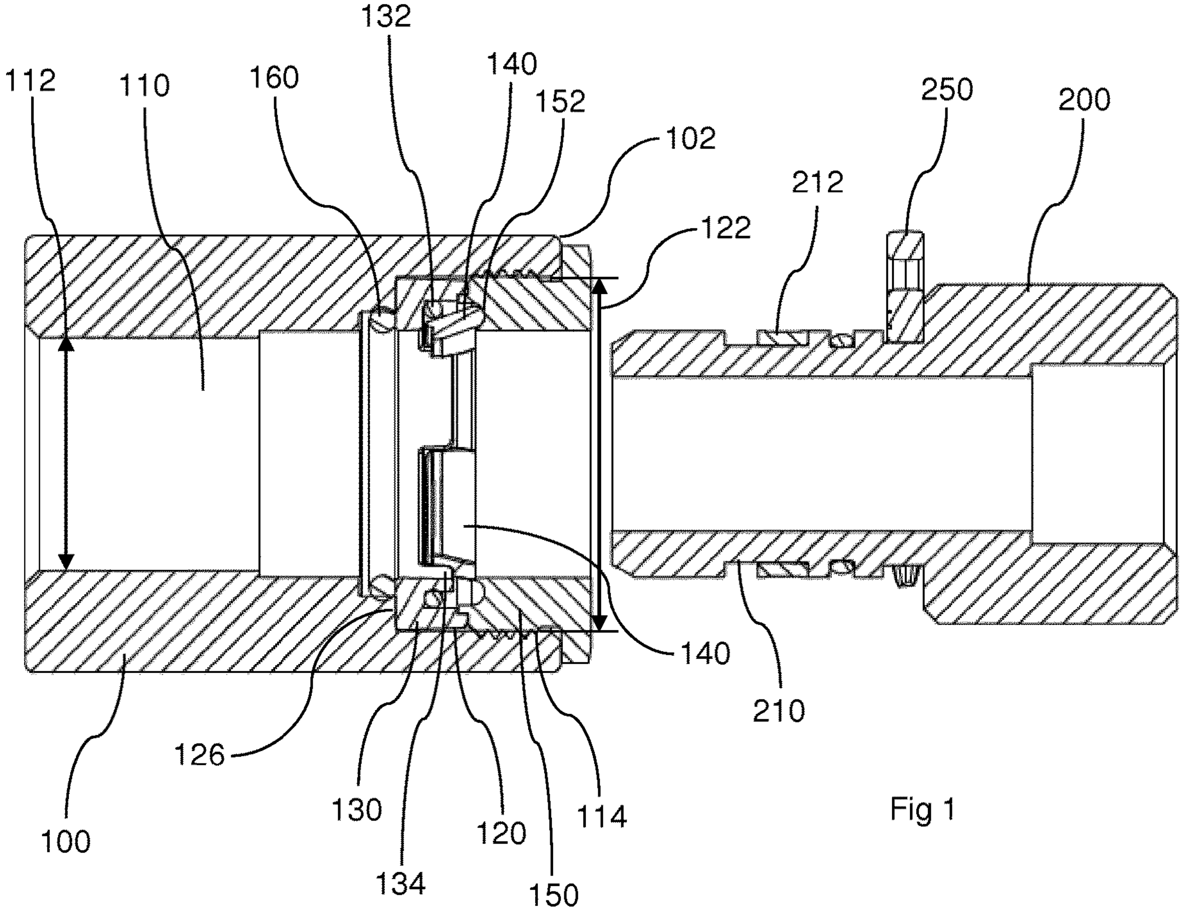
FIG. 1 is a diagrammatic illustration of an exemplary embodiment of a coupling according to the present disclosure and a nipple.
Figure 2:
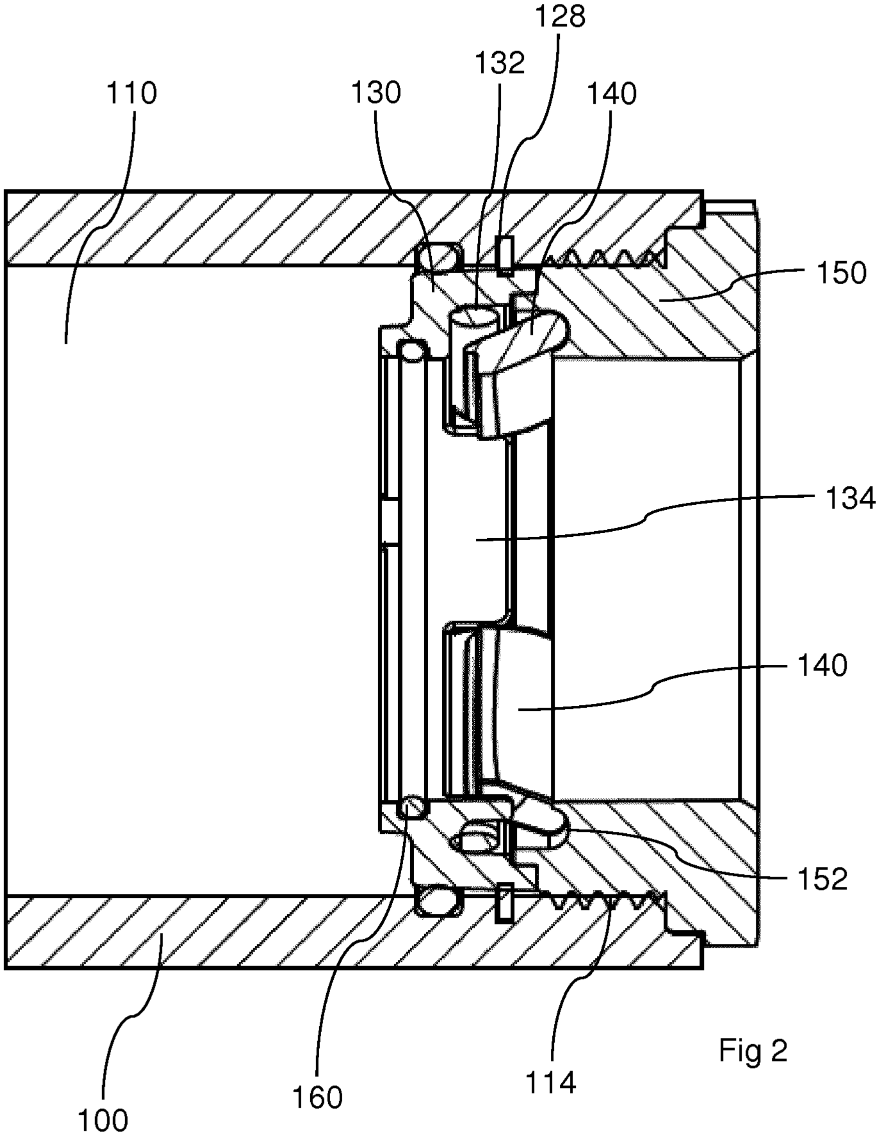
FIG. 2 is a diagrammatic illustration of an exemplary embodiment of a coupling according to the present disclosure.
Figure 3:
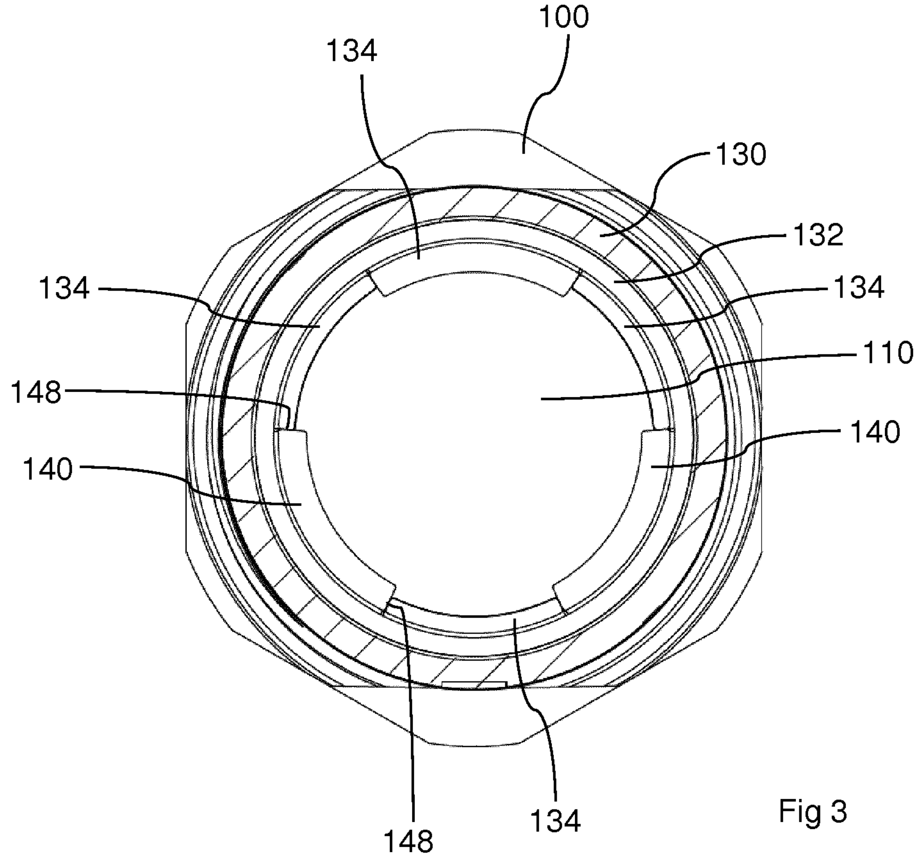
FIG. 3 is a diagrammatic illustration of an exemplary embodiment of a coupling according to the present disclosure.
Figure 4:
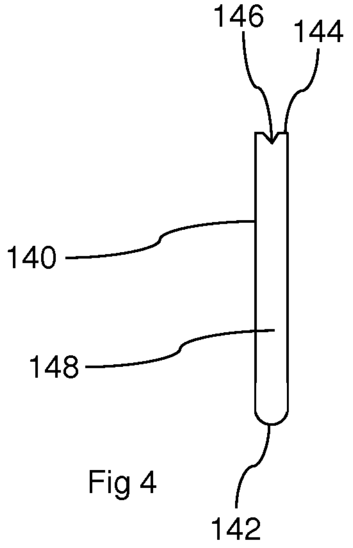
FIG. 4 is a diagrammatic illustration of an exemplary embodiment of a locking element according to the present disclosure.
Figure 5:
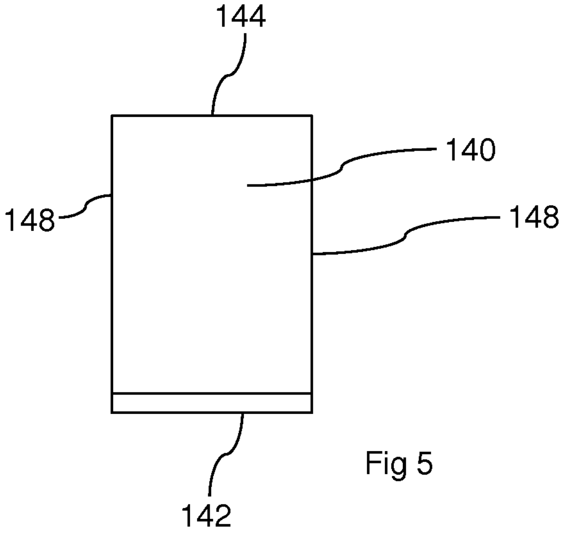
FIG. 5 is a diagrammatic illustration of an exemplary embodiment of a locking element according to the present disclosure.
Figure 6:
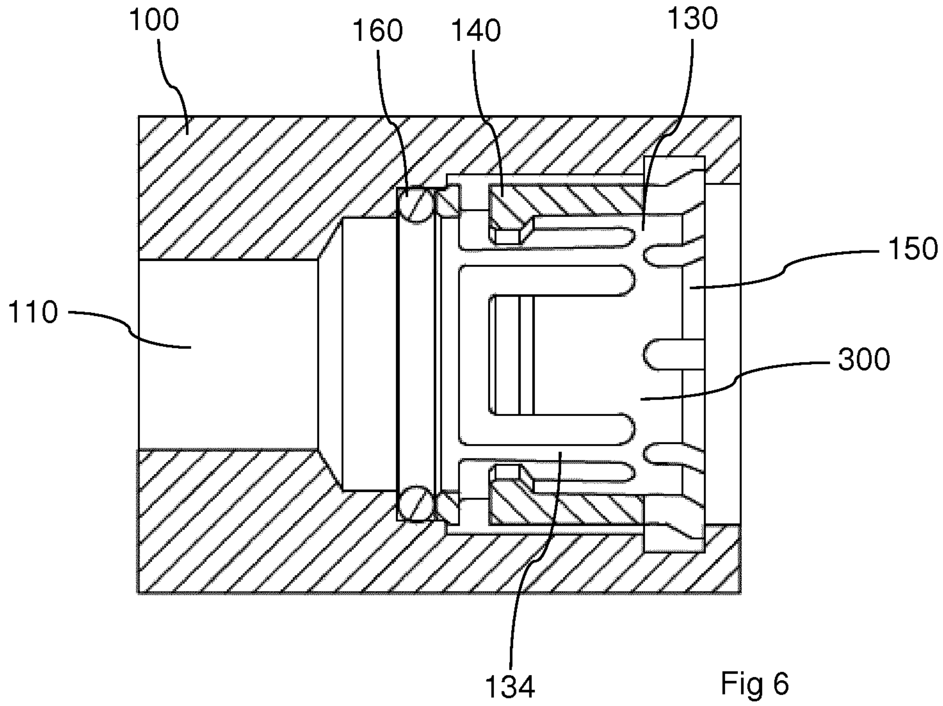
FIG. 6 is a diagrammatic illustration of an exemplary embodiment of a coupling according to the present disclosure.

FIGS. 1 to 6 are diagrammatic illustrations of exemplary embodiments. FIG. 1 illustrates the coupling and the nipple. FIGS. 2, 3, and 6 illustrate only the coupling, and FIGS. 4 and 5 illustrate an exemplary element, a locking element 140, from the coupling. FIG. 3 illustrates a view in the axial direction of an exemplary embodiment of the coupling, illustrating how the holder 130 holds the locking elements 140.

Turning to FIG. 1, the coupling for a nipple, comprises: a main body 100; and an opening 110, for a fluid, in the main body 100, the opening 110 being cylindrical. The coupling further comprises a holder 130 arranged in the opening 110, the holder 130 holding a plurality of locking elements 140 for locking the nipple to the coupling, the holder 130 and the plurality of locking elements 140 being separate; and a retaining element 150 retaining the holder 130 in the opening 110, the retaining element 150 engaging the plurality of locking elements 140.

FIG. 1 illustrates the coupling and the nipple 200. Turning first to the nipple 200, the nipple 200 has a removable stop 250 preventing the nipple 200 from being pushed further into the coupling. The nipple 200 has also a groove 210 in which a slidable ring 212 is arranged around the nipple. The ring 212 assists to lift locking elements off the nipple 200.

The coupling has a main body 100 with an opening 110 for fluid. The opening 110 may be a through hole through the main body 100. Fluid flow connected between the coupling and nipple may flow through the opening 110. The opening 110 may be for the nipple 200. The holder 130 is arranged in the opening 110, preferably by form fitting and/or sliding the holder 130 into the opening 110. The holder 130 may fit snuggly in the opening 110, and can therefore be easily inserted and removed. The holder 130 may be substantially cylindrical in shape, having an inside and an outside. The holder 130 holds, supports, the plurality of separate locking elements 140 for locking the nipple to the coupling. The holder 130 and the plurality of locking elements 140 are separate from each other, i.e. they are not integral parts. According to one embodiment, the holder 130, an elastic element 132, the plurality of locking elements 140, and the retaining element 150 are separate and independent parts, elements, from each other, i.e. not integral.

The retaining element 150 retains the holder 130 in the body of the nipple 100. According to one embodiment, an axial side of the retaining element 150 engages an axial side of the holder 130. The retaining element 150 engages, supports, the plurality of locking elements 140. Hereby the retaining element 150 may take up large, mainly axial, force within the coupling. These forces may come from the nipple being locked by the locking elements 140 and the fluid pressure within the coupling trying to force the nipple out of the coupling. This allows the holder 130 to merely hold the locking elements in the correct place for connecting and disconnecting the coupling and nipple, that is the holder 130 may not need to take up any large forces. According to one embodiment, an axial side of the retaining element 150 engages the plurality of locking elements 140 as well as the axial side of the holder 130.

According to one embodiment, the holder 130 may comprise a separate elastic element 132 urging each locking element 140 inwardly. The elastic element 132 may be an o-ring, or x-ring. The elastic element 132 may be arranged on the inside of the holder 130 and in contact with the holder 130 and each locking element 140, preferably closer to the side of the locking element 140 that is away from the retaining element 150. The elastic member 132 may allow the locking elements 140 to flex outwards and be pushed inwards to allow the nipple to be locked or un-locked from the coupling. Each locking element 140 may swing an angle of about less than 45 degrees, preferably less than 30 degrees, preferably less than 20 degrees. This amount of swing allows for the locking element 140 to move no more than necessary, and allows for locking element 140 to be rotatably supported by the retaining element 150.

As best shown in FIGS. 4 and 5, according to one embodiment, each locking element 140 may be a separate element and may be substantially rectangular with one rounded end 142 and an opposite end 144 having a groove 146. The rounded end 142 may be in the shape of a semicircle, i.e. a semi cylinder. Each locking element 140 may be straight (i.e. flat), as illustrated in FIGS. 4 and 5, or curved, as illustrated in FIG. 3. Preferably each locking element 140 is curved. Both straight and curved locking elements may have a groove 146 at one end 144, the groove 146 may be configured for engaging the nipple 200. The groove 146 may be substantially in the middle of, central to, the end 144. The rounded end 142 is opposite the end 144, and the rounded end 142 may be configured for engaging the retaining element 150, preferably in a groove of the retaining element 150. The holder 130 may support, engage, each locking element 140.

According to one embodiment, each locking element 140 may have two sides 148 parallel to the axial direction of the nipple when the locking element 140 is in the coupling. Each side 148 of the locking element 140 may be supported, engaged with, in contact with by the holder 130.

According to one embodiment, the holder 130 may comprise a plurality of extensions 134 extending in the axial direction of the coupling, see FIGS. 1 to 3, and 6. Each extension may have two sides parallel to the axial direction of the coupling, when the holder 130 is in the coupling. Each side may be in contact with a side 148 of a locking element 140, respectively. Each side may be flat. In this way the holder 130 may support and guide each locking element 140 in the right position for locking the nipple into the coupling. The extensions 134 may be a form of protrusions. The protrusions 134 may be curved radially, see FIG. 3. The extensions may be between each locking element 140, i.e. when viewing the holder 130 with the locking elements 140, between two locking elements 140 there may be one extension 134. This may allow for the locking elements 140 to be held by the holder 130, i.e. the locking elements 140 and the holder 130 forming one package, one unit, one cage 300. The number of extensions 134 may be the same as the number of locking elements 140.

According to one embodiment, the holder 130 may be arranged between a shoulder 126 and the retaining element 150. The shoulder 126 may be formed by the opening 110 and a second opening 120. According to one embodiment, the opening 110 may have a first diameter 112. The second opening 120 may be in the main body 100, the second opening 120 may be cylindrical, having a second diameter 122. The second opening 120 may be co-axial with the first opening 110 and the second diameter 122 may be larger than the first diameter (112). In this way a shoulder 126 may be formed. The holder 130 may be arranged in the second opening 120, and the holder 130 may be clamped between the shoulder 126 and the retaining element 150.

According to one embodiment, a sealing element 160 may be arranged on the main body 100, and/or on the holder 130, for sealing against the nipple. The sealing element 160 may be arranged in the opening 110. The sealing element may be an o-ring or and x-ring. The sealing element 160 may be arranged by both, and held between, the main body 100 and the holder 130, see FIG. 1. The holder 130 may have a groove for holding the sealing element 160, see FIG. 2.

According to one embodiment, the holder 130 may be arranged between a stop 128 and the retaining element 150, the stop 128 may be arranged in the opening 110, see FIG. 2. The stop 128 may be a circular flat ring with a slit. The stop 128 may be arranged in an opening of the main body 100. The main body 100 may hold the stop. The stop 128 may protrude inwards in a radial direction, engaging, stopping, the holder 130 to move axially in one or both axial directions. The stop 128 may be a separate element, holding, catching the holder 130, and preventing axial movement of the holder 130 relative to the opening 110.

According to one embodiment, a sealing element may be arranged between the holder 130 and the main body 100, see FIG. 2. The sealing element may be an o-ring or an x-ring.

According to one embodiment, the retaining element 150 may comprise a locking element groove 152 for engaging the plurality of locking elements 140. The locking element groove 152 may be on the axial side facing the holder 130, and the locking element groove 152 may be circular around the whole side. The locking element groove 152 may be substantially semi-circular in a cross view, allowing the rounded end 142 of each locking element 140 to fit into the locking element groove 152. Hereby the locking elements 140 are supported, for locking the nipple, directly by the retaining element 150. This relieves the holder 130 from taking up large axial forces within the coupling, while at the same time allowing for easy assembly.

According to one embodiment, the holder 130 may be made out of plastic. According to one embodiment, the locking elements 140 may be made out of metal, for example steel, and the retaining element 150 may be made of metal, for example steel. The holder 130 merely holds the locking elements 140 in the right position, but the holder 130 does not have to take up any large forces that may act on the locking element 140. Large axial forces on the locking elements 140 are transferred to the retaining element 150. Therefore, and especially for lower fluid pressures, the holder 130 may be made out of plastic.

According to one embodiment, the holder 130 may hold 2, 3, 4, 5, 6, 7, 8, or 9 locking elements 140. Preferably the holder 130 holds 3 locking elements 140, see FIG. 3. Preferably the holder 130 holds 4 locking elements 140.

According to one embodiment, the coupling is a push-pull coupling, or a click-to-connect coupling. The coupling may be a quick connect coupling, such as for example a push to connect and push-pull to disconnect coupling. Preferably the coupling is a WEO plug-in coupling, a click to connect, for a WEO nipple according to its open standard.

According to one embodiment, the retaining element 150 may engage the main body 100 by threads 114. The retaining element 150 may be screw connected to the main body 100. Threads facing inwards may be on the main body 100 and corresponding threads facing outwards may be on the retaining element 150. The retaining element 150 may have a flange positioning the retaining element 150 in the right axial position for supporting the locking elements 140. The flange may protrude outwardly and may engage the main body 100 of the coupling, preferably at an end thereof. Hereby a swift and precise assembly of the coupling is made.

According to one embodiment, the holder 130, the plurality of locking elements 140, and the retaining element 150 may be integrally formed as one cylindrical cage 300, the cage 300 may have a plurality of outwardly projecting protrusions as the retaining element 150, see FIG. 6. The outwardly projecting protrusions may engage a side of an opening that has a larger diameter than the opening that holds the cage 300 in the main body 100. In this embodiment, the elastic element 132 may be an integrally part of the cylindrical cage 300, and therefore there may be no need for a separate elastic element 132. Preferably the cage 300 is made out of a plastic material. These embodiments may be suitable for couplings for low pressure, that is for fluid pressures below 200 bar (2900 PSI), preferably below 150 bar (2175 PSI), preferably below 100 bar (1450 PSI). The locking element 140, of the cage 300, may comprise a radially inwards extending protrusion for engaging the nipple. Hereby the locking element 140 does not bend in the radial direction, i.e. the locking element 140 may be parallel to the axial direction of the coupling. The protrusion may flex the locking element 140 outwards when the nipple is inserted, and when the nipple is in place, then the protrusion of the locking element 140 falls into the groove 210 of the nipple. This allows for the locking element 140 to take up axial forces in a straight and rest position. The cage 300 may be dimensioned such that the inside of the locking element 140 rest flush with the outside of the nipple when the nipple is connected to the coupling. This allows the locking element 140 to get support from the nipple. In this embodiment with the cage 300, then the sealing member 160 may be held between an axial end of the cage 300 and an axial side of an opening of the main body 100. This allows for a swift and accurate assembly of the coupling.

According to one embodiment, a method for assembling a coupling according to any one of the preceding embodiments is disclosed. The method comprises the following steps: inserting the holder 130 with the locking means 140 into the main body 100; and retaining the holder 130 in the main body 100 with the retaining means 150. The retaining means 150 is inserted into the main body 100 to retain the holder 130 in place. Preferably the steps are taken in order. This allows for an easy and fast assembly, and also provides high quality with a high degree of accuracy. According to one embodiment, an additional step may be to insert the sealing means 160 into the main body 100 or into the holder 130 as the first or second step.

According to one embodiment, the disclosed coupling and assembly method allows for easy and fast replacement of worn out features in the coupling. This allows for easy, fast and good maintenance.

According to at least one embodiment disclosed herein, a coupling for a nipple, and a method for assembling such a coupling is provided and disclosed. At least one embodiment provides a coupling that connects with existing nipples. At least one embodiment provides a coupling that is inexpensive to manufacture, is easy to manufacture, is easy to assemble, and is robust. At least one embodiment provides a coupling that is safe, and that can be scaled and easily adapted to different uses and embodiments. At least one embodiment provides a method resulting in fast and easy assembly, and also provides high quality with a high degree of accuracy.

It will be apparent to those skilled in the art that various modifications and variations can be made to the coupling for a nipple and the method for assembling such a coupling. Other embodiments will be apparent to those skilled in the art from consideration of the specification and practice of the disclosed coupling. It is intended that the specification and examples be considered as exemplary only, with a true scope being indicated by the following claims and their equivalents.

LIST OF ELEMENTS FOR THE COUPLING

100 housing
110 opening
114 threads
120 second opening
126 shoulder
128 stop
130 holder
132 elastic element
134 extension
140 locking element
142 rounded edge
144 edge
146 groove
148 side
150 retaining element
152 locking element groove
200 nipple
250 stop
210 groove
212 ring
300 cage

The invention claimed is:

1. A coupling for a nipple, comprising:

a main body having a cylindrical opening, for a fluid;

a holder arranged in the opening, the holder holding a plurality of locking elements for connecting and disconnecting the nipple to the coupling, the holder, the main body, and the plurality of locking elements each being separate, and wherein each of the plurality of locking elements is separate from each other; and a retaining element retaining the holder in the opening, the retaining element engaging the plurality of locking elements, wherein the retaining element comprises a circumferential locking element groove having a substantially semi-circular cross-section for engaging the plurality of locking elements, wherein the locking element groove opens axially to receive the plurality of locking elements in an axial direction, wherein each locking element has a rounded end received in the circumferential locking element groove, wherein the retaining element is separate from the holder, the locking elements, and the main body, wherein the plurality of locking elements facilitate connecting and disconnecting between the nipple and the main body, wherein each locking element has two sides parallel to the axial direction of the nipple, each side being supported by the holder, and wherein each of the plurality of locking elements is individually removable and replaceable without removing the holder from the opening and without removing any other one of the plurality of locking elements.

2. The coupling according to claim 1, wherein the holder comprises a separate elastic element urging each locking element inwardly.

3. The coupling according to claim 1, wherein the holder is arranged between a shoulder and the retaining element, the shoulder being formed by the opening and a second opening.

4. The coupling according to claim 1, wherein a sealing element is arranged on the main body, and/or on the holder, for sealing against the nipple.

5. The coupling according to claim 1, wherein the holder is made out of plastic.

6. The coupling according to claim 1, wherein the holder holds 2, 3, 4, 5, 6, 7, 8, or 9 locking elements.

7. The coupling according to claim 1, wherein the coupling is a push-pull coupling.

8. The coupling according to claim 1, wherein the retaining element engages the main body by threads.

9. The coupling according to claim 1, wherein the holder comprises a plurality of extensions extending in the axial direction of the coupling, each extension having two sides parallel to the axial direction of the coupling, each extension being in contact with one of the sides of a respective one or more of the plurality of locking elements, respectively.

10. The coupling according to claim 1, wherein each locking element is a separate element and is substantially rectangular with the rounded end and an opposite end having a groove.

11. The coupling according to claim 1, wherein the holder is arranged between a stop and the retaining element, the stop being arranged in the opening.

12. The coupling according to claim 1, wherein the coupling is a click-to-connect coupling.

13. A method for assembling a coupling according to claim 1, wherein the method comprises the following steps:

inserting the holder with the plurality of locking elements into the main body; and retaining the holder in the main body with the retaining element.

14. A coupling comprising:

a main body having an opening, for a fluid, disposed in the main body, the opening being cylindrical;

a holder arranged in the opening, the holder holding a plurality of locking elements for releasably connecting and disconnecting a nipple to the coupling in a repeatable manner;

wherein the holder, the main body, and the plurality of locking elements are each separate, wherein each of the plurality of locking elements is separate from each other, and wherein each of the plurality of locking elements is individually removable from and individually replaceable in the holder without removing any other one of the plurality of locking elements; and a retaining element retaining the holder in the opening, the retaining element engaging the plurality of locking elements, wherein the retaining element comprises a locking element groove, the locking element groove being substantially semi-circular in cross-section, for engaging the plurality of locking elements, wherein the locking element groove opens axially to receive the plurality of locking elements in an axial direction to permit individual axial insertion and individual axial removal of each locking element through the locking element groove, wherein the retaining element is separate from the holder, the locking elements, and the main body, and wherein the plurality of locking elements facilitate connecting and disconnecting between the nipple and the main body, wherein the retaining element engages the main body by threads.

* * * * *